United States Patent
Wehmeier et al.

(10) Patent No.: US 8,381,567 B2
(45) Date of Patent: Feb. 26, 2013

(54) PROCEDURE AND DEVICE FOR DETECTING MANIPULATIONS AT LAMBDA PROBES

(75) Inventors: Kersten Wehmeier, Ludwigsburg (DE); Michael Fey, Wiernsheim (DE); Andreas Koring, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 565 days.

(21) Appl. No.: 12/611,237

(22) Filed: Nov. 3, 2009

(65) Prior Publication Data
US 2010/0107728 A1     May 6, 2010

(30) Foreign Application Priority Data
Nov. 3, 2008   (DE) .................. 10 2008 043 407

(51) Int. Cl.
*G01M 15/10*     (2006.01)
*F02D 41/22*     (2006.01)
(52) U.S. Cl. ....... 73/1.06; 701/29.8; 701/30.4; 701/30.5
(58) Field of Classification Search .................. 73/1.06, 73/23.31, 114.69, 114.74, 114.77; 701/29.8, 701/30.4–30.5; 702/116
See application file for complete search history.

(56) References Cited

U.S. PATENT DOCUMENTS

| | | | | |
|---|---|---|---|---|
| 8,286,462 B2 * | 10/2012 | Odendall et al. | ............... | 73/1.06 |
| 8,286,470 B2 * | 10/2012 | Bevot et al. | ............... | 73/114.69 |
| 2008/0016847 A1 * | 1/2008 | Arlt et al. | ............... | 60/274 |
| 2008/0083211 A1 * | 4/2008 | Barnikow et al. | ............... | 60/273 |
| 2009/0126344 A1 * | 5/2009 | Arlt et al. | ............... | 60/276 |
| 2009/0254264 A1 * | 10/2009 | Kirstaetter et al. | ............ | 701/109 |
| 2011/0113751 A1 * | 5/2011 | Arlt et al. | ............... | 60/274 |
| 2011/0138876 A1 * | 6/2011 | Arlt et al. | ............... | 73/23.31 |
| 2011/0184700 A1 * | 7/2011 | Michalske et al. | ............ | 702/182 |

FOREIGN PATENT DOCUMENTS

| | | | |
|---|---|---|---|
| DE | 4435801 A1 * | 4/1996 | |
| WO | WO 2006069845 A2 * | 7/2006 | |
| WO | WO 2006128782 A1 * | 12/2006 | |

* cited by examiner

*Primary Examiner* — Thomas P Noland
(74) *Attorney, Agent, or Firm* — Merchant & Gould P.C.

(57) ABSTRACT

A procedure for detecting manipulations at lambda comprises the following steps; the lambda probe is excited by at least one electric excitation signal; at least one electric response signal of the probe is detected; the at least one response signal is compared to at least one default electric response signal that characterizes a not manipulated probe; the deviation of the detected at least one electric response signal from the at least one default electric response signal is used for detecting a manipulation of the probe. A device for detecting manipulations at lambda probes characterized by a switch assembly, with which the probe can be impinged with an electric excitation signal, in particular a step-wise electric excitation, preferably with a current impulse, by a evaluation switch device for evaluating a response signal, in particular the probe voltage and for comparing the excitation signal with the response signal and for assuming a manipulation in the case of a deviation of the response signal from a response signal that characterizes a not manipulated probe.

10 Claims, 3 Drawing Sheets

US 8,381,567 B2

PROCEDURE AND DEVICE FOR DETECTING MANIPULATIONS AT LAMBDA PROBES

This application claims benefit of Serial No. 10 2008 043 407.8, filed 3 Nov. 2008 in Germany and which application is incorporated herein by reference. To the extent appropriate, a claim of priority is made to the above disclosed application.

TECHNICAL FIELD

The invention relates to a procedure and a device for detecting manipulations at lambda probes in a combustion engine.

Subject matter of the present invention is also a computer program and a computer program product, which qualify for implementing the procedure.

BACKGROUND

The functionality of lambda probes at combustion engines as a part of the exhaust gas purification system has to be checked within the range of the on-board-diagnosis (OBD). This also includes the checking of manipulations at lambda probes, which influence the probe dynamic. For detecting a reduced lambda probe dynamic it is nowadays usual to evaluate a reaction of the probe upon a lambda change in the engine control systems. Therefore a step-wise lambda change is for example used such as during the transition from a rich to a lean exhaust gas mixture at a boost turn off. A step-wise lambda course would result in an approximately step-wise course of the probe signal at an erroneous lambda probe. Deviations from this course, for example a delay or a slurring of the probe signal indicate on the other hand a reduced probe dynamic. In the praxis however a step-wise course of the air value lambda for example downstream of a catalytic converter is generally not given. Moreover does the lambda course already provide an unknown more or less slurred profile, which has an effect upon the reaction of the probe. For this reason those check procedures can only detect comparably long delays in the probe course, which lie for example in the range of 100 ms. Shorter delays can on the other hand not clearly be used as an indication for a reduced probe dynamic.

A sufficiently good probe dynamic is now a significant requirement for an optimal purification of the exhaust gas. It is therefore the task of the invention to detect electric manipulations at any random position in the signal circuit between the sensor element of the lambda probe and for example an analog digital converter (ADC) in the control unit, which cause a delay or slurring of the probe signal. Significantly shorter delay times should thereby be reliably detected than with the previous methods.

SUMMARY

This task is solved by a procedure and a device. Compared to the previously used procedures, which evaluate the response of the probe upon a lambda change, the procedure and the device according to the invention have the advantage that the reaction upon an electric excitation of the probe is here evaluated. Thus there is no active lambda adjustment for checking the functionality of the probe undertaken, but an electric excitation and evaluation of an electric response signal of the probe upon this electric excitation. The procedure and the device according to the invention provide as opposed to procedures that are known from the state of the art, the great advantage that the electric excitation of the probe and the evaluation of a response signal of the probe upon an electric excitation signal does not cause increased exhaust gas emissions.

Thus it is provided according to an advantageous embodiment to create the electric excitation signal as a step-wise electric excitation of the probe.

A step-wise electric excitation of the probe is independent of the exhaust gas ratios that are present during the checking.

The electric excitation signal is preferably a current pulse, with which the probe is impinged.

The probe is thereby preferably impinged with a current pulse over a period of time of 1 ms to 5 ms, in particular over a period of time of approximately 3 ms. Due to this plus-wise electric excitation the detection of very short delay times, in particular of approximately 10 ms is possible.

As the electric response signal preferably a change of the probe voltage above the probe is used.

A not manipulated probe is thereby assumed if the change of the probe voltage follows the current impulse, with which the probe is impinged, directly without a time delay.

A manipulation by a permanent delay of the probe signal on the other hand is assumed if the change of the probe voltage follows each current impulse with a time delay.

A manipulation by a temporal freezing of the probe signal is assumed if the change of the probe voltage follows some of the current impulses with a time delay.

The duration of the delay due to a manipulation can be determined by repeating the checking in short distances in the case of a manipulation suspicion. The duration of the delay is thereby approximately the time between the last still successful and the first successful checking.

A manipulation by a permanent or temporal low-pass filtering is on the other hand assumed, if a slurring of the probe voltage is detected.

The device according to the invention for detecting manipulations at lambda probes provides a switch assembly, with which the probe can be impinged with an electric excitation signal, in particular with a step-wise electric excitation, preferably with a current impulse and a evaluation circuit device for evaluating a response signal, in particular the probe voltage, furthermore a comparing unit for comparing the excitation signals with the response signal and for assuming a manipulation in the case of a deviation of the response signal from a response signal that characterizes a not manipulated probe and is for example stored or deposited.

BRIEF DESCRIPTION OF THE DRAWINGS

Embodiments of the invention are illustrated in the drawings and further explained in the following description.

It is shown in.

DETAILED DESCRIPTION

Figure 1:
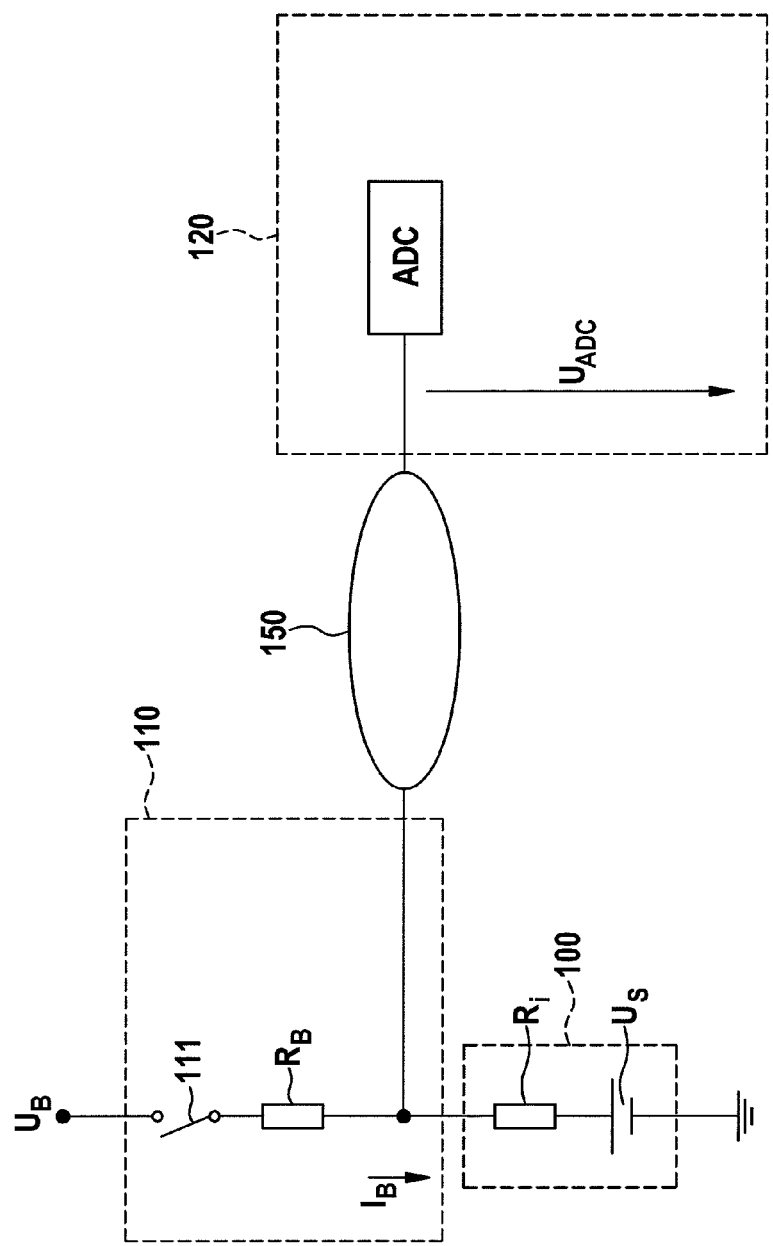
FIG. 1 is a device according to the invention for detecting manipulations at lambda probes.

FIG. 1 schematically shows a probe 100 as an equivalent circuit diagram. The probe basically represents a voltage source, which produces a probe voltage $U_s$ and it provides an inner resistance $R_i$. This probe is impinged by a switch assembly 110 with an electric excitation signal $I_B$, therefore the switch 111 is temporarily close, so that a load voltage $U_B$ is applied over a load resistance $R_B$ at the probe 100 and the load current $I_B$ flows through the probe 100. This temporal closing and opening of the switch 111 takes place step-wise in the form of a current pulse over the time interval of 1 ms up to 5 ms, in particular over a time interval of 3 ms. The impinging with the current pulse can also take place periodically.

In order to detect whether a manipulation M has been undertaken at a random position in the signal circuit between the probe element, which means the probe 100, and a control unit 120, which provides an analog-digital converter ADC, which causes a delay or slurring of the probe signal (in FIG. 1 schematically shown by the reference sign 150), the probe voltage $U_{ADC}$, which means the probe voltage that is applied at the analog-digital converter is evaluated as response signal.

The excitation signal is therefore the current pulse $I_B$ and the response signal is the probe voltage $U_{ADC}$, as it is applied at the analog-digital converter and converter there into digital values.

Figure 2:
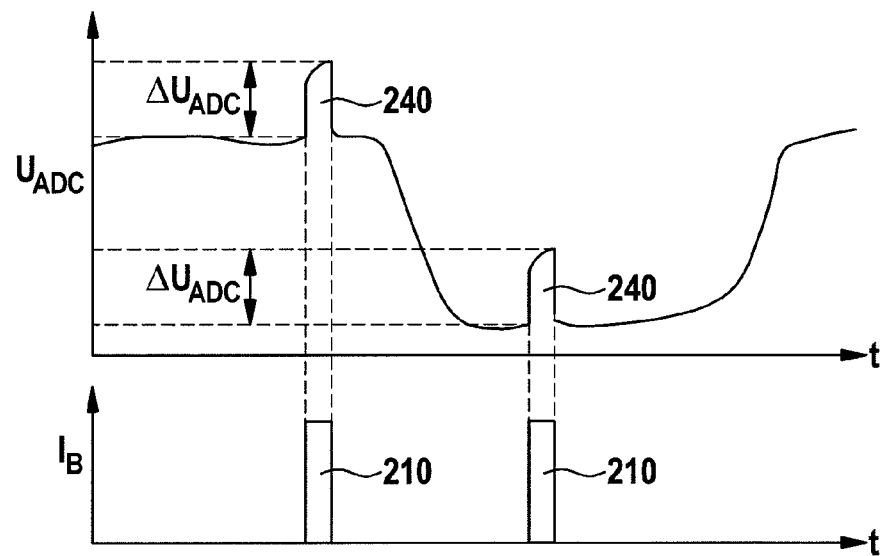
FIG. 2 is an excitation signal and the response signal at a not manipulated probe.

FIG. 2 schematically shows the excitation signal $I_B$ as well as the response signal $U_{ADC}$ above the time t.

Pulses 210 of the excitation signal $I_B$ are followed directly without a time delay by pulses 240 of the response signal $U_{ADC}$. The probe voltage $U_{ADC}$ increases thereby pulse-wise by a value $\Delta U_{ADC}$. This increase $\Delta U_{ADC}$ can be detected and evaluated. FIG. 2 schematically shows the response signal of an erroneous two-point lambda probe 100 at a pulse-wise current load. The turning on of the load current $I_B$ causes a step-wise increase $\Delta U_{ADC}$ of the probe signal due to the inner resistance $R_i$ of the probe 100 almost without a delay, within approximately 1 ms. When turning off the load current $I_B$ the probe signal $U_{ADC}$ jumps back to the value before the load. If the voltage increase is detected therefore shortly after activating the current load this indicates a not manipulated system. In order to avoid that a voltage increase is wrongly interpreted to be caused by a current load due to a lambda change, the probe signal, thus the response signal $\Delta U_{ADC}$, can be compared before and after the current load.

If both values differ from each other only slightly it can be assumed that the temporary voltage increase has been the result of the current load, which means of the output signal.

Figure 3:
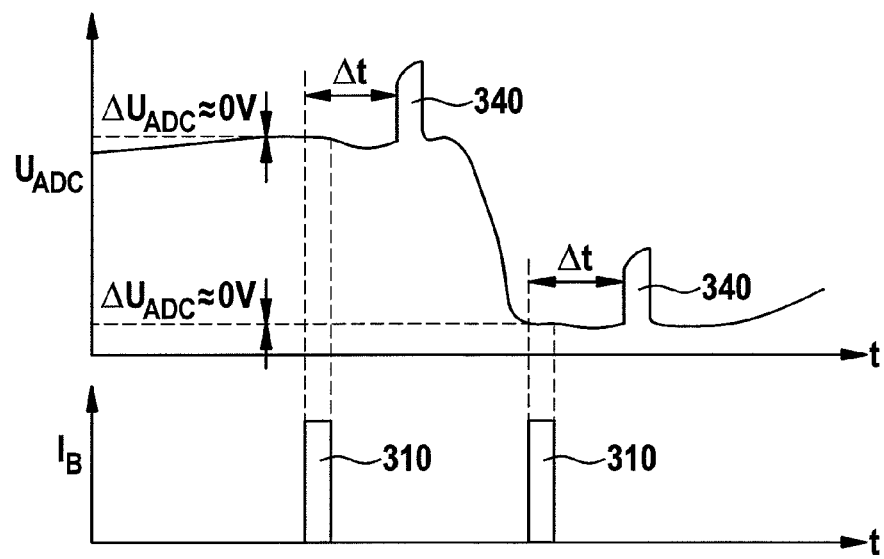
FIG. 3 is the excitation signal and the response signal at a probe that is manipulated due to a permanent delay of the probe signal.

A manipulated lambda probe 100 at which the manipulation is realized by a permanent delay cause a phase shifting of the complete probe signal. This means that the response signal $\Delta U_{ADC}$ follows phase-shifter after the excitation signal $I_B$, as it is shown schematically in FIG. 3. FIG. 3 also shows schematically the excitation signal, which means the current pulses $I_B$ and the response signal, which means the probe voltage $U_{ADC}$ above the time t. Current pulses 130 of the excitation signal are not directly followed by pulse-wise increases of the probe signal. Those pulses 340 are rather timely shifted by a value $\Delta t$. in the point of time of the excitation signal pulses 310 on the other hand the change of the probe voltage, which means of the response signal $\Delta U_{ADC}$ approximately 0 V. thus if shortly after activating the current load no significant voltage increase is detected in the response signal this indicates a manipulation. Such a manipulation can for example be caused by a ring memory. In order to avoid here again some error messages a comparison of the probe signals can be provided before and after the load. The procedure is also qualified to determine the delay time due to the manipulation by determining the time between the activation of the current load, which means the impinging with current pulses 310 and the reaction, which are reflected in the probe signal by pulses 340. In other means the value of the time delay $\Delta t$ can be determined.

Figure 4:
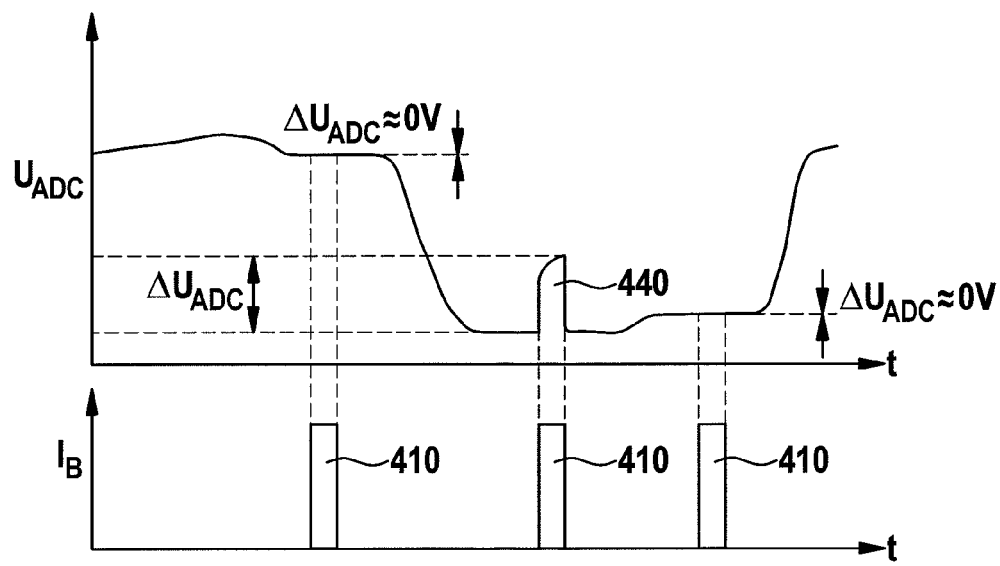
FIG. 4 is the excitation signal and the response signal at probe that is manipulated due to a temporal delay of the probe signal and FIG. 5 is the excitation signal and the response signal at a probe that is manipulated due to a permanent or temporal low-pass filtering.

A delay of the probe signal in the form that the signal is temporarily frozen can thereby be detected in that a current load does not cause any reaction of the probe signal in the freezing phase, as it is schematically shown in FIG. 4. Exactly as in the previously described case of a permanent delay in connection with FIG. 3 this manipulation can be thereby detected in that shortly after activating the current load, which means the impinging of the probe 100 with current pulses 410 no voltage increase of the probe signal $U_{ADC}$ can be detected, which means that $\Delta U_{ADC} \approx 0$ V. in a later course of the probe voltage a current pulse 440 can be on the other detected when the "freezing time" of the signal is over. The delay time due to the manipulation can be determined by periodically repeating the checking in short distances in a case of a manipulation suspicion. The delay time is then approximately the time between the last still successful and the first successful checking. A temporary freezing of the signal can for example take place at a flank of the probe signal.

Figure 5:
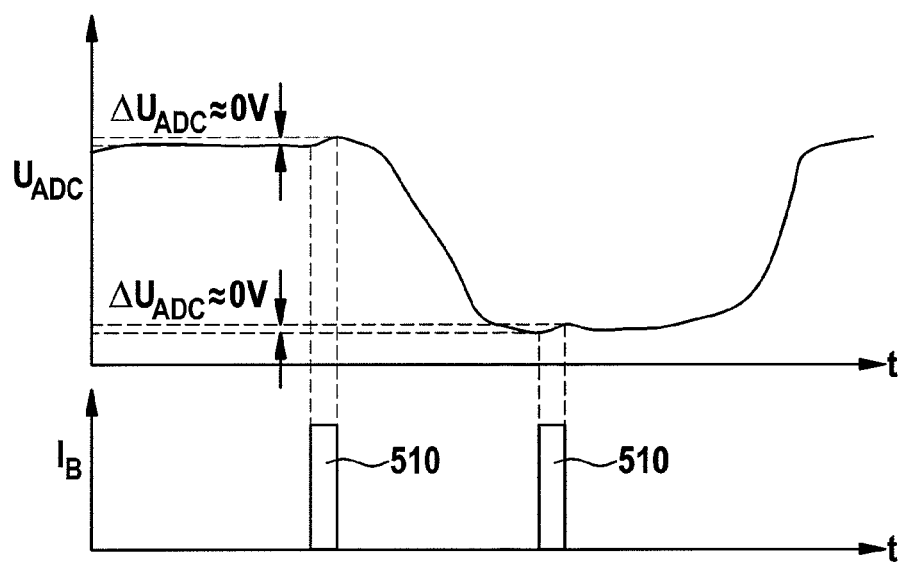

A permanent or temporary low-pass filtering of the probe signal causes furthermore that a pulse-wise current load causes a strong slurring of the probe signal and can even not be detected anymore at a correspondingly high filtering time constant. This manipulation due to a temporary or permanent low-pass filtering, whereby a temporary low-pass filtering can for example only be effective in the case of a flank of the probe signal, is schematically shown in FIG. 5. A low-pass filtering with a sufficient high filtering time constant can therefore be thereby detected, in that it is checked whether a significant voltage increase of the response signal, which means of the probe signal $U_{ADC}$ is detected directly after impinging with current pulses 510. If this is not the case, thus if the increase is $\Delta U_{ADC} \leqq 0$ V, thus a slurring of the probe signal $U_{ADC}$ is present, a low-pass filtering has to be assumed for all current pulses 510.

The present described procedure can for example be implemented and run as a computer program on an arithmetic unit, in particular the control unit 120 of the combustion engine. The program code can be stored on a machine-readable medium, which can be read by the control unit 120.

The invention claimed is:

1. A procedure for detecting manipulations at lambda probes comprising the following steps:
   the lambda probe is excited by at least one electric excitation signal, wherein the electric excitation signal is a step-wise electric excitation of the probe, wherein the electric excitation signal is a current pulse, with which the probe is impinged;
   at least one electric response signal ($\Delta$UADC) of the probe is detected;
   the at least one response signal ($\Delta$UADC) is compared to at least one default electric response signal that characterizes a not manipulated probe; and
   the deviation of the detected at least one electric response signal ($\Delta$UADC) from the at least one default electric response signal is used for detecting a manipulation of the probe, wherein a change ($\Delta$UADC) of the probe voltage (UADC) that can be picked up above the probe is evaluated as electric response signal.

2. The procedure according to claim 1, wherein the probe is impinged with a current pulse over a time interval of 1 to 5 ms.

3. The procedure according to claim 2, wherein if the change ($\Delta$UADC) of the probe voltage follows the current pulse directly without a time delay a not manipulated probe is assumed.

4. The procedure according to claim 2, wherein if the change ($\Delta$UADC) of the probe voltage (UADC) follows every current pulse with a time delay a manipulation by a permanent delay of the probe signal is assumed.

5. The procedure according to claim 2, in that if the change ($\Delta$UADC) of the probe voltage (UADC) follows some of the current pulses with a time delay a manipulation by a temporary freezing of the probe signal is assumed.

6. The procedure according to claim 2, wherein if a slurring of the probe voltage (UADC) is detected a manipulation by a permanent or temporary low-pass filtering is assumed.

7. The procedure according to claim 1, wherein when detecting a manipulation the step-wise electric excitation of the probe periodically place in short time distances.

8. A computer program, which carries out all steps of a procedure according to claim 1 when it runs on a control unit of a combustion engine.

9. A computer program product with a program code, which is stored on a machine-readable medium, for implementing the procedure according to claim 1 when the program is carried out on a computer or a control unit of a motor vehicle.

10. A device for detecting manipulations at lambda probes comprising:
a switch assembly configured to impinge the probe with an electric excitation signal, wherein the electric excitation signal is a step-wise electric excitation of the probe, wherein the electric excitation signal is a current pulse, with which the probe is impinged; and
an evaluation unit configured to evaluate a response signal to compare the excitation signal with the response signal, and to assume a manipulation in the case of a deviation of the response signal from a response signal that characterizes a not manipulated probe, wherein a change of a probe voltage that can be picked up above the probe is evaluated as electric response signal.

* * * * *

UNITED STATES PATENT AND TRADEMARK OFFICE
CERTIFICATE OF CORRECTION

PATENT NO. : 8,381,567 B2  Page 1 of 1
APPLICATION NO. : 12/611237
DATED : February 26, 2013
INVENTOR(S) : Wehmeier et al.

It is certified that error appears in the above-identified patent and that said Letters Patent is hereby corrected as shown below:

In the Specification

Col. 4, line 35: "increase is $\Delta U_{ADC} \leqq 0$ V, thus" should read --increase is $\Delta U_{ADC} \approx 0$ V, thus--

Signed and Sealed this
Seventh Day of October, 2014

Michelle K. Lee
*Deputy Director of the United States Patent and Trademark Office*